(No Model.)
W. H. HANSON.
FENCE.
No. 523,571. Patented July 24, 1894.
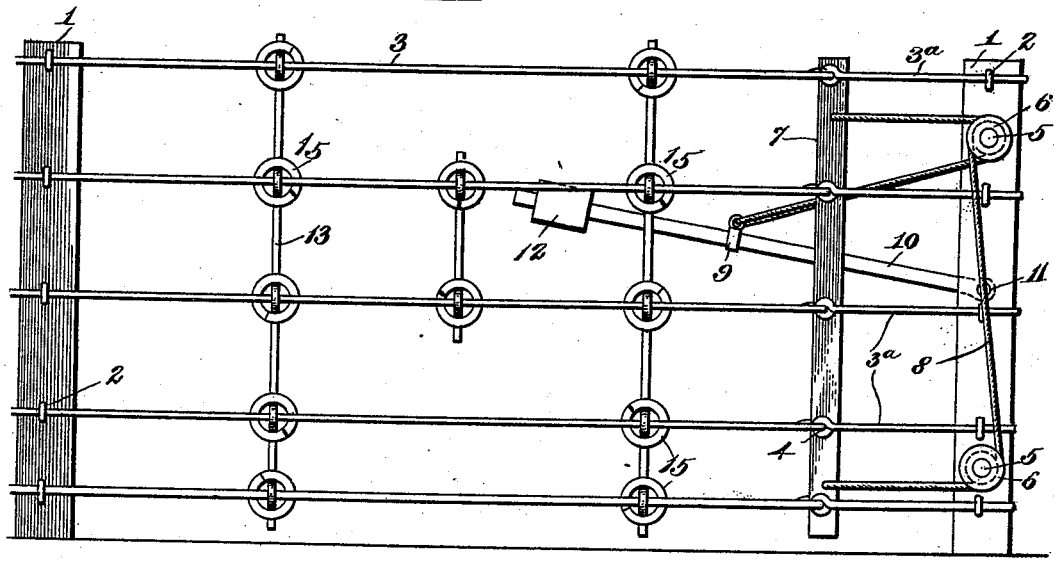
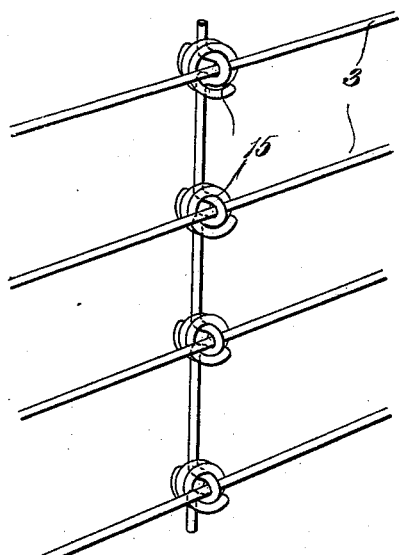
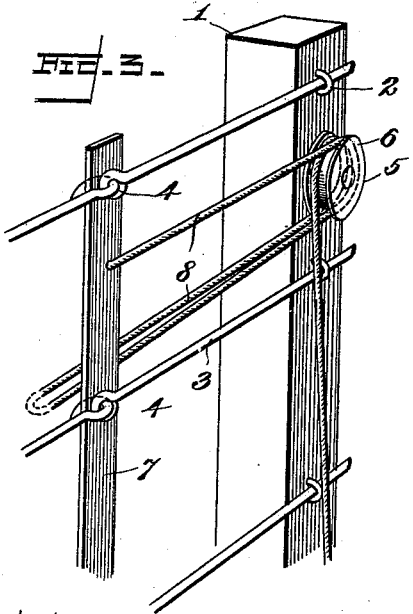
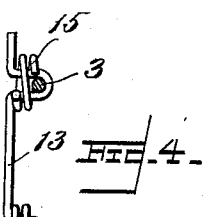
WITNESSES:
Edw. S. Duvall, Jr.
John W. Gardner.
INVENTOR:
W. H. Hanson,
By W. J. Duvall, Attorney.

UNITED STATES PATENT OFFICE.

WILLIAM H. HANSON, OF SCOTCH RIDGE, OHIO, ASSIGNOR OF ONE-HALF TO DAVID WHITMORE, OF SAME PLACE.

FENCE.

SPECIFICATION forming part of Letters Patent No. 523,571, dated July 24, 1894.

Application filed April 10, 1894. Serial No. 506,995. (No model.)

*To all whom it may concern:*

Be it known that I, WILLIAM H. HANSON, a citizen of the United States, residing at Scotch Ridge, in the county of Wood and State of Ohio, have invented certain new and useful Improvements in Fences; and I do hereby declare the following to be a full, clear, and exact description of the invention, such as will enable others skilled in the art to which it appertains to make and use the same.

My invention relates to improvements in wire fences, the objects in view being to produce a fence that is of simple, cheap, and durable construction, and wherein the line wires are maintained at a uniform distance apart, or in other words in parallelism, and under a tension that will automatically compensate for the extension and contraction of the wires as caused by heat and cold or otherwise.

Other objects and advantages of the invention will appear in the following description, and the novel features thereof will be particularly pointed out in the claims.

Referring to the drawings:—Figure 1 is a side elevation of one panel of my improved fence. Fig. 2 is a perspective view of a series of the line wires and a stay and fastener. Fig. 3 is a perspective view of a portion of the takeup or tension device. Fig. 4 is a sectional view through the line series the stay being shown in elevation.

Like numerals of reference indicate like parts in all the figures of the drawings.

1 designates an ordinary fence post, the same being preferably formed of wood and set in the ground in any suitable manner. To the corresponding faces of a series of these posts are applied, by means of staples 2, the line wires 3 of which there may be any number, the same corresponding with the staples. The line wires pass loosely through the staples and are therefore capable of longitudinal movement throughout their length. The line wires terminate short of one of the end posts, and are connected thereto by short strands 3ª, the connections being formed by ordinary hook and eye joints 4.

Applied to the face of that post most adjacent to the hook and eye joints 4 and mounted upon upper and lower stub-shafts 5, are grooved pulleys 6. An equalizing bar 7 having perforations corresponding with the wires is engaged over the hooks of the joints 4 of the several wires, and an equalizing rope or cable 8 is connected to the lower portion of the bar 7, passes therefrom around the lower pulley 6 up in a reverse direction around the upper pulley 6, thence to the side of the fence where it is connected to the eye of a cuff or sleeve 9, and from this latter again passes over the upper pulley 6, reversely to the first pass, and is finally connected to the upper end of the equalizing bar 7. The eye or cuff 9 is rigidly secured at an intermediate point of a lever 10 which is pivoted or fulcrumed at its inner end at 11 to the post 1, upon which the pulleys 6 are mounted. The outer end of the lever supports a weight 12 which may be movable or stationary, and exerts a constant tendency to depress the free end of the lever, thus drawing the equalizing rope around the pulleys and imparting a strain to the equalizing bar. The bar being connected to the several strands or line wires 3 keeps them constantly under tension and yet they are free to yield to any ordinary contraction or strain.

The several strands or line wires 3 may be connected by any desired character of stay and they may be all connected or only a few. I have illustrated a preferred form of stay in the drawings and have indicated the same as 13. This stay is formed of wire and at its point of intersection with each line wire is provided with an offset or kink 14 to embrace or receive the line wire. To the terminals of these kinks a suitable fastener is applied, such fastener closing the entrance to the kinks and preventing a disengagement of the same from the line wires.

The preferred form of fastener consists of a short piece of wire coiled, the same being indicated by the numeral 15. The coil is an open one and hence may be applied like the ordinary screw to its position, and when in position is efficient and cannot become disconnected accidentally, but only by a reverse revolution of it.

The strands may be cheaply produced by machinery designed for giving the necessary kink and the coils may be in a like manner cheaply produced by any ordinary wire coiling machine.

As a result of my invention it will be seen that I obtain an extremely strong yet light and inexpensive fence that may be readily set up and maintained in repair and which will automatically expand and contract with strain or as influenced by heat and cold.

Having described my invention, what I claim is—

1. The combination with fence posts and strand or line wires loosely applied thereto, of an equalizing bar connected to the several wires, upper and lower loosely rotatable pulleys applied to an adjacent post, a weighted lever pivoted at its inner end to said post, and a tension wire cable connected between its ends to the lever and having its terminals at opposite sides of its connection passed about the pulleys and secured beyond the same to the equalizing bar, substantially as specified.

2. The combination of fence posts, staples applied thereto, line wires passing loosely through the staples, and terminating short of one of the posts, an equalizing bar perforated to engage the line wires of fence, upper and lower shafts extending from the post adjacent to the bar, grooved pulleys loosely mounted on the shafts, a lever pivoted at its inner end to said post and provided with an eye, and a wire cable connected between its ends to the eye and having its terminals passed about the upper pulley, one of its terminals being connected to the upper end of the draft bar and its remaining terminal being passed under the lower pulley and connected to the lower end of the draft bar, substantially as specified.

3. In a fence the combination with posts and wire strands, of a stay kinked to receive the strands, and the coiled wire fasteners applied as shown, substantially as specified.

In testimony whereof I affix my signature in presence of two witnesses.

WILLIAM H. HANSON.

Witnesses:
W. A. CHURCH,
O. F. KELLY.